United States Patent
Hu et al.

(10) Patent No.: US 12,177,822 B2
(45) Date of Patent: Dec. 24, 2024

(54) TONE ALIGNMENT FOR DISTRIBUTED-TONE RESOURCE UNITS IN 6GHZ LOW-POWER INDOOR SYSTEMS

(71) Applicant: MediaTek Singapore Pte. Ltd., Singapore (SG)

(72) Inventors: Shengquan Hu, San Jose, CA (US); Jianhan Liu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 111 days.

(21) Appl. No.: 17/583,147

(22) Filed: Jan. 24, 2022

(65) Prior Publication Data
US 2022/0248401 A1 Aug. 4, 2022

Related U.S. Application Data

(60) Provisional application No. 63/144,549, filed on Feb. 2, 2021.

(51) Int. Cl.
*H04W 72/0453* (2023.01)
*H04W 52/02* (2009.01)

(52) U.S. Cl.
CPC ... *H04W 72/0453* (2013.01); *H04W 52/0209* (2013.01)

(58) Field of Classification Search
None
See application file for complete search history.

(56) References Cited

U.S. PATENT DOCUMENTS

| | | | |
|---|---|---|---|
| 2016/0142187 A1 | 5/2016 | Yang et al. | |
| 2020/0014509 A1* | 1/2020 | Asterjadhi | ............ H04L 5/0041 |
| 2020/0014599 A1 | 1/2020 | Asterjadhi et al. | |
| 2021/0392661 A1* | 12/2021 | Cao | ........ H04L 5/0048 |
| 2024/0129058 A1* | 4/2024 | Min | ..................... H04L 5/0044 |

FOREIGN PATENT DOCUMENTS

| | | |
|---|---|---|
| CN | 114449627 A | 5/2022 |
| WO | WO 2019208254 A1 | 10/2019 |

OTHER PUBLICATIONS

China National Intellectual Property Administration, 1st Office Action in China Patent Application No. 202210092780.1, Sep. 29, 2024.

* cited by examiner

*Primary Examiner* — Phirin Sam
(74) *Attorney, Agent, or Firm* — Andy M. Han; Han IP PLLC

(57) ABSTRACT

Various schemes pertaining to tone alignment for distributed-tone resource units (dRUs) in 6 GHz low-power indoor (LPI) systems are described. A communication entity distributes subcarriers of a resource unit (RU) over a bandwidth to generate a dRU with tone alignment. The communication entity then communicates wirelessly using the dRU in a 6 GHz LPI system.

6 Claims, 17 Drawing Sheets

DATA AND PILOT SUBCARRIER INDICES FOR DISTRIBUTED-TONE RUs (dRUs) IN A 20MHz EHT TB PPDU FOR 6GHz LPI

| dRU Type | dRU Index and Subcarrier Range |
|---|---|
| 26-TONE dRU i = 1:9 | dRU(i) = [Lru,Uru], where Lru = L1st+S(i)+[V,V+Np,V+2*Np,...,V+12*Np]; Uru = (-1)*flipIr(Lru); Np = 9; V = [0]; S = [0,4,2,6,8,1,5,3,7] |
| 52-TONE dRU i = 1:4 | dRU(i) = [Lru,Uru], where Lru = L1st+S(i)+[V,V+Np,V+2*Np,...,V+12*Np]; Uru = (-1)*flipIr(Lru); Np = 9; V = [0,4]; S = [0,2,1,3] |
| 106-TONE dRU i = 1:2 | dRU(i) = [Lru,Uru], where Lru = L1st+S(i)+[V,V+Np,V+2*Np,...,V+12*Np,V(1)+13*Np]; Uru = (-1)*flipIr(Lru); Np = 9; V = [0,2,4,6]; S = [0,1] |

FIG. 4

DATA AND PILOT SUBCARRIER INDICES FOR DISTRIBUTED-TONE RUs (dRUs) IN A 20MHZ EHT TB PPDU FOR 6GHZ LPI

| dRU TYPE | dRU INDEX AND SUBCARRIER RANGE | | | | |
|---|---|---|---|---|---|
| 26-TONE dRU | dRU1<br>[-122:9:-14, 14:9:122] | dRU2<br>[-118:9:-10, 10:9:118] | dRU3<br>[-120:9:-12, 12:9:120] | dRU4<br>[-116:9:-8, 8:9:116] | dRU5<br>[-114:9:-6, 6:9:114] |
| | dRU6<br>[-121:9:-13, 13:9:121] | dRU7<br>[-117:9:-9, 9:9:117] | dRU8<br>[-119:9:-11, 11:9:119] | dRU9<br>[-115:9:-7, 7:9:115] | |
| 52-TONE dRU<br>i = 1:4 | dRU1<br>26-TONE [dRU1, dRU2] | | dRU2<br>26-TONE [dRU3, dRU4] | | |
| | dRU3<br>26-TONE [dRU6, dRU7] | | dRU4<br>26-TONE [dRU8, dRU9] | | |
| 106-TONE dRU<br>i = 1:2 | dRU1<br>26-TONE [dRU1~4] OR 52-TONE [dRU1~2], [-5,5] | | | | |
| | dRU2<br>26-TONE [dRU6~9] OR 52-TONE [dRU3~4], [-4,4] | | | | |

FIG. 5

DATA AND PILOT SUBCARRIER INDICES FOR DISTRIBUTED-TONE RUs (dRUs) IN A 20MHz EHT TB PPDU FOR 6GHz LPI

| dRU Type | dRU Index and Subcarrier Range |
|---|---|
| 26-TONE dRU $i = 1:9$ | $dRU(i) = [Lru, Uru]$, where $Lru = (-1)*(13*Np+floor(Ndc/2))+S(i)+[V, V+Np, V+2*Np, ..., V+12*Np]$; $Uru = (-1)*fliplr(Lru)$; $Np = 9$; $V = [0]$; $S = [0,4,2,6,8,1,5,3,7]$ |
| 52-TONE dRU $i = 1:4$ | $dRU(i) = [Lru, Uru]$, where $Lru = (-1)*(13*Np+floor(Ndc/2))+S(i)+[V, V+Np, V+2*Np, ..., V+12*Np]$; $Uru = (-1)*fliplr(Lru)$; $Np = 9$; $V = [0,4]$; $S = [0,2,1,3]$ |
| 106-TONE dRU $i = 1:2$ | $dRU(i) = [Lru, Uru]$, where $Lru = (-1)*(13*Np+floor(Ndc/2))+S(i)+[V(4)-Np, V, V+Np, V+2*Np, ..., V+12*Np]$; $Uru = (-1)*fliplr(Lru)$; $Np = 9$; $V = [0,2,4,6]$; $S = [0,1]$ |

FIG. 8

DATA AND PILOT SUBCARRIER INDICES FOR DISTRIBUTED-TONE RUs (dRUs) IN A 20MHZ EHT TB PPDU FOR 6GHZ LPI

| dRU Type | dRU Index and Subcarrier Range | | | | |
|---|---|---|---|---|---|
| | dRU1 | dRU2 | dRU3 | dRU4 | dRU5 |
| 26-TONE dRU | [-118:9:-10, 10:9:118] | [-114:9:-6, 6:9:114] | [-116:9:-8, 8:9:116] | [-112:9:-4, 4:9:112] | [-110:9:-2, 2:9:110] |
| | dRU6 | dRU7 | dRU8 | dRU9 | |
| | [-117:9:-9, 9:9:117] | [-113:9:-5, 5:9:113] | [-115:9:-7, 7:9:115] | [-111:9:-3, 3:9:111] | |
| 52-TONE dRU i = 1:4 | dRU1 26-TONE [dRU1, dRU2] | | dRU2 26-TONE [dRU3, dRU4] | | |
| | dRU3 26-TONE [dRU6, dRU7] | | dRU4 26-TONE [dRU8, dRU9] | | |
| 106-TONE dRU i = 1:2 | dRU1 26-TONE [dRU1~4] OR 52-TONE [dRU1~2], [-121,121] | | | | |
| | dRU2 26-TONE [dRU6~9] OR 52-TONE [dRU3~4], [-120,120] | | | | |

FIG. 9

Data and Pilot Subcarrier Indices for Distributed-Tone RUs (dRUs) in a 20MHz EHT TB PPDU for 6GHz LPI

1100

| dRU Type | dRU Index and Subcarrier Range |
|---|---|
| 26-TONE dRU i = 1:9 | dRU(i) = [Lru,Uru], where Lru = L1st+S(i)+[V,V+Np,V+2*Np,...,V+12*Np]; Uru = Lru − L1st + DCshift; Np = 9; V = [0]; S = [0,4,2,6,8,1,5,3,7] |
| 52-TONE dRU i = 1:4 | dRU(i) = [Lru,Uru], where Lru = L1st+S(i)+[V,V+Np,V+2*Np,...,V+12*Np]; Uru = Lru − L1st + DCshift; Np = 9; V = [0,4]; S = [0,2,1,3] |
| 106-TONE dRU i = 1:2 | dRU(i) = [Lru,Uru], where Lru = L1st+S(i)+[V,V+Np,V+2*Np,...,V+12*Np,V(1)+13*Np]; Uru = Lru − L1st + DCshift; Np = 9; V = [0,2,4,6]; S = [0,1] |

FIG. 11

DATA AND PILOT SUBCARRIER INDICES FOR DISTRIBUTED-TONE RUs (dRUs) IN A 20MHz EHT TB PPDU FOR 6GHz LPI

| dRU TYPE | dRU Index and Subcarrier Range | | | | |
|---|---|---|---|---|---|
| | dRU1 | dRU2 | dRU3 | dRU4 | dRU5 |
| 26-TONE dRU | [-122:9:-14, 2:9:110] | [-118:9:-10, 6:9:114] | [-120:9:-12, 4:9:112] | [-116:9:-8, 8:9:116] | [-114:9:-6, 10:9:118] |
| | dRU6 | dRU7 | dRU8 | dRU9 | |
| | [-121:9:-13, 3:9:111] | [-117:9:-9, 7:9:115] | [-119:9:-11, 5:9:113] | [-115:9:-7, 9:9:117] | |
| 52-TONE dRU i = 1:4 | dRU1 26-TONE [dRU1, dRU2] | | dRU2 26-TONE [dRU3, dRU4] | | |
| | dRU3 26-TONE [dRU6, dRU7] | | dRU4 26-TONE [dRU8, dRU9] | | |
| 106-TONE dRU i = 1:2 | dRU1 26-TONE [dRU1~4] OR 52-TONE [dRU1~2], [-5,119] | | | | |
| | dRU2 26-TONE [dRU6~9] OR 52-TONE [dRU3~4], [-4,120] | | | | |

FIG. 12

DATA AND PILOT SUBCARRIER INDICES FOR DISTRIBUTED-TONE RUS (DRUS) IN A 20MHZ EHT TB PPDU FOR 6GHZ LPI

| dRU Type | dRU Index and Subcarrier Range |
|---|---|
| 26-TONE dRU i = 1:9 | dRU(i) = [Lru,Uru], where Lru = (-1)*(13*Np+floor(Ndc/2))+S(i)+[V,V+Np,V+2*Np,...,V+12*Np]; Uru = ceil(Ndc/2)+S(i)+[V,V+Np,V+2*Np,...,V+12*Np]; Np = 9; V = [0]; S = [0,4,2,6,8,1,5,3,7] |
| 52-TONE dRU i = 1:4 | dRU(i) = [Lru,Uru], where Lru = (-1)*(13*Np+floor(Ndc/2))+S(i)+[V,V+Np,V+2*Np,...,V+12*Np]; Uru = ceil(Ndc/2)+S(i)+[V,V+Np,V+2*Np,...,V+12*Np]; Np = 9; V = [0,4]; S = [0,2,1,3] |
| 106-TONE dRU i = 1:2 | dRU(i) = [Lru,Uru], where Lru = (-1)*(13*Np+floor(Ndc/2))+S(i)+[V(4)-Np,V,V+Np,V+2*Np,...,V+12*Np]; Uru = ceil(Ndc/2)+S(i)+[V,V+Np,V(1)+13*Np]; Np = 9; V = [0,2,4,6]; S = [0,1] |

FIG. 14

TONE ALIGNMENT FOR DISTRIBUTED-TONE RESOURCE UNITS IN 6GHZ LOW-POWER INDOOR SYSTEMS

CROSS REFERENCE TO RELATED PATENT APPLICATION

The present disclosure is part of a non-provisional patent application claiming the priority benefit of U.S. Provisional Patent Application No. 63/144,549, filed 2 Feb. 2021, the content of which being incorporated by reference in its entirety.

TECHNICAL FIELD

The present disclosure is generally related to wireless communications and, more particularly, to tone alignment for distributed-tone resource units (dRUs) in 6 GHz low-power indoor (LPI) systems.

BACKGROUND

Unless otherwise indicated herein, approaches described in this section are not prior art to the claims listed below and are not admitted as prior art by inclusion in this section.

Under current regulations by the Federal Communications Commission (FCC) regarding wireless communications in the 2.4-GHz and 5-GHz bands, the equivalent isotropically radiated power (EIRP) of a power spectral density (PSD) limit is capped at 20 dBm for 2-MHz transmission and the transmission (Tx) power limit is capped at 30 dBm. With a reasonable Tx power assumption, the FCC requirement would not limit Tx power for narrow-bandwidth transmissions. On the other hand, the FCC requirement regarding 6-GHz LPI applications is far more stringent than PSD requirement for the 2.4-GHz and 5-GHz bands. For instance, the EIRP limit is at 5 dBm/MHz for an access point (AP) station (STA) in 6-GHz LPI versus an EIRP limit of 17 dBm/MHz for AP STA in the 5-GHz band. Similarly, the EIRP limit is at −1 dBm/MHz for an non-AP station (STA) in 6-GHz LPI versus an EIRP limit of 11 dBm/MHz for non-AP STA in the 5-GHz band. As there can be different sizes of distributed-tone RUs, or dRUs (herein interchangeably referred to as "interleaved RUs" and "interleaved-tone RUs", or "interlaced RUs" and "interlaced-tone RUs"), in different bandwidths, how subcarrier of a given RU are distributed over a bandwidth to boost Tx power in a 6 GHz LPI system remains to be defined. Therefore, there is a need for a solution for tone alignment for dRUs in 6 GHz LPI systems.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to tone alignment for dRUs in 6 GHz LPI systems. The present disclosure proposes multiple options and methods for tone alignment for a dRU in a wider bandwidth.

In one aspect, a method may involve distributing subcarriers of RU over a bandwidth to generate a dRU with tone alignment. The method may also involve communicating wirelessly using the dRU.

In another aspect, an apparatus may include a transceiver and a processor coupled to the transceiver. The transceiver may be configured to transmit and receive wirelessly. The processor may be configured to distribute subcarriers of RU over a bandwidth to generate a dRU with tone alignment. The processor may be also configured to communicate wirelessly using the dRU.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 4 is a diagram of an example design in accordance with an implementation of the present disclosure.

FIG. 5 is a diagram of an example design in accordance with an implementation of the present disclosure.

FIG. 8 is a diagram of an example design in accordance with an implementation of the present disclosure.

FIG. 9 is a diagram of an example design in accordance with an implementation of the present disclosure.

FIG. 11 is a diagram of an example design in accordance with an implementation of the present disclosure.

FIG. 12 is a diagram of an example design in accordance with an implementation of the present disclosure.

FIG. 14 is a diagram of an example design in accordance with an implementation of the present disclosure.

DETAILED DESCRIPTION OF PREFERRED EMBODIMENTS

Figure 1:
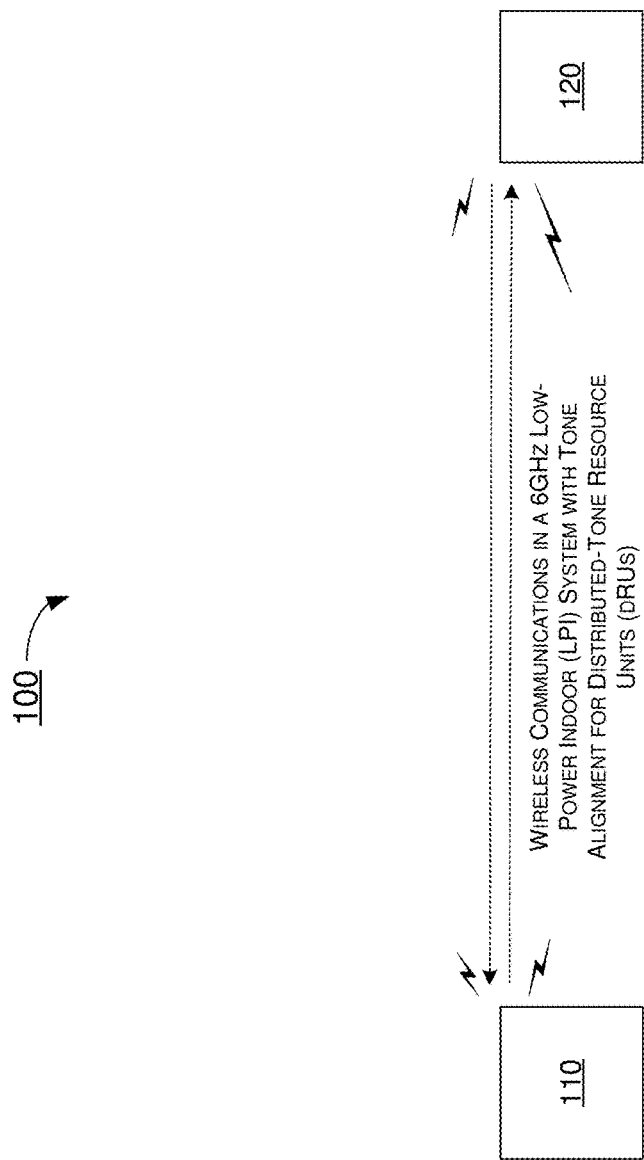
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to tone alignment for distributed-tone RUs in 6 GHz LPI systems. According to the present disclosure, a number of possible solutions may be implemented separately or jointly. That is, although these possible solutions may be described below separately, two or more of these possible solutions may be implemented in one combination or another.

It is noteworthy that, in the present disclosure, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular MRU may be interchangeably denoted as MRU78 (or rMRU78), an aggregate (26+106)-tone regular MRU may be interchangeably denoted as MRU132 (or rMRU132), and so on. Furthermore, in the present disclosure, a 26-tone distributed-tone RU may be interchangeably denoted as dRU26, a 52-tone distributed-tone RU may be interchangeably denoted as dRU52, a 106-tone distributed-tone RU may be interchangeably denoted as dRU106, a 242-tone distributed-tone RU may be interchangeably denoted as dRU242, and so on. Additionally, an aggregate (26+52)-tone distributed-tone MRU may be interchangeably denoted as dMRU78, an aggregate (26+106)-tone distributed-tone MRU may be interchangeably denoted as dMRU132, and so on.

Since the above examples are merely illustrative examples and not an exhaustive listing of all possibilities, the same applies to regular RUs, distributed-tone RUs, MRUs, and distributed-tone MRUs of different sizes (or different number of tones). It is also noteworthy that, in the present disclosure, a bandwidth of 20 MHz may be interchangeably denoted as BW20, a bandwidth of 40 MHz may be interchangeably denoted as BW40, a bandwidth of 80 MHz may be interchangeably denoted as BW80, a bandwidth of 160 MHz may be interchangeably denoted as BW160, a bandwidth of 240 MHz may be interchangeably denoted as BW240, and a bandwidth of 320 MHz may be interchangeably denoted as BW320. It is further noteworthy that, in the present disclosure, a 26-tone interleaved-tone (or interlaced-tone) RU may be interchangeably denoted as iRU26, a 52-tone interleaved-tone (or interlaced-tone) RU may be interchangeably denoted as iRU52, a 106-tone interleaved-tone (or interlaced-tone) RU may be interchangeably denoted as iRU106, a 242-tone interleaved-tone (or interlaced-tone) RU may be interchangeably denoted as iRU242, and a 484-tone interleaved-tone (or interlaced-tone) RU may be interchangeably denoted as iRU484.

FIG. 1 illustrates an example network environment 100 in which various solutions and schemes in accordance with the present disclosure may be implemented. FIG. 2~FIG. 17 illustrate examples of implementation of various proposed schemes in network environment 100 in accordance with the present disclosure. The following description of various proposed schemes is provided with reference to FIG. 1~FIG. 17.

Referring to FIG. 1, network environment 100 may involve a communication entity 110 and a communication entity 120 communicating wirelessly (e.g., in a WLAN in accordance with one or more IEEE 802.11 standards). For instance, communication entity 110 may be a first station (STA) and communication entity 120 may be a second STA, with each of the first STA and second STA functioning as either an AP STA or a non-AP STA. Under various proposed schemes in accordance with the present disclosure, subcarriers of a given RU may be distributed over a wider bandwidth (e.g., 80 MHz, 160 MHz or 320 MHz) with tone alignment to boost Tx power in 6 GHz LPI system. Accordingly, communication entity 110 and communication entity 120 may be configured to communicate wirelessly with tone alignment for distributed-tone RUs (dRUs) in 6 GHz LPI systems, as described herein.

Figure 2:
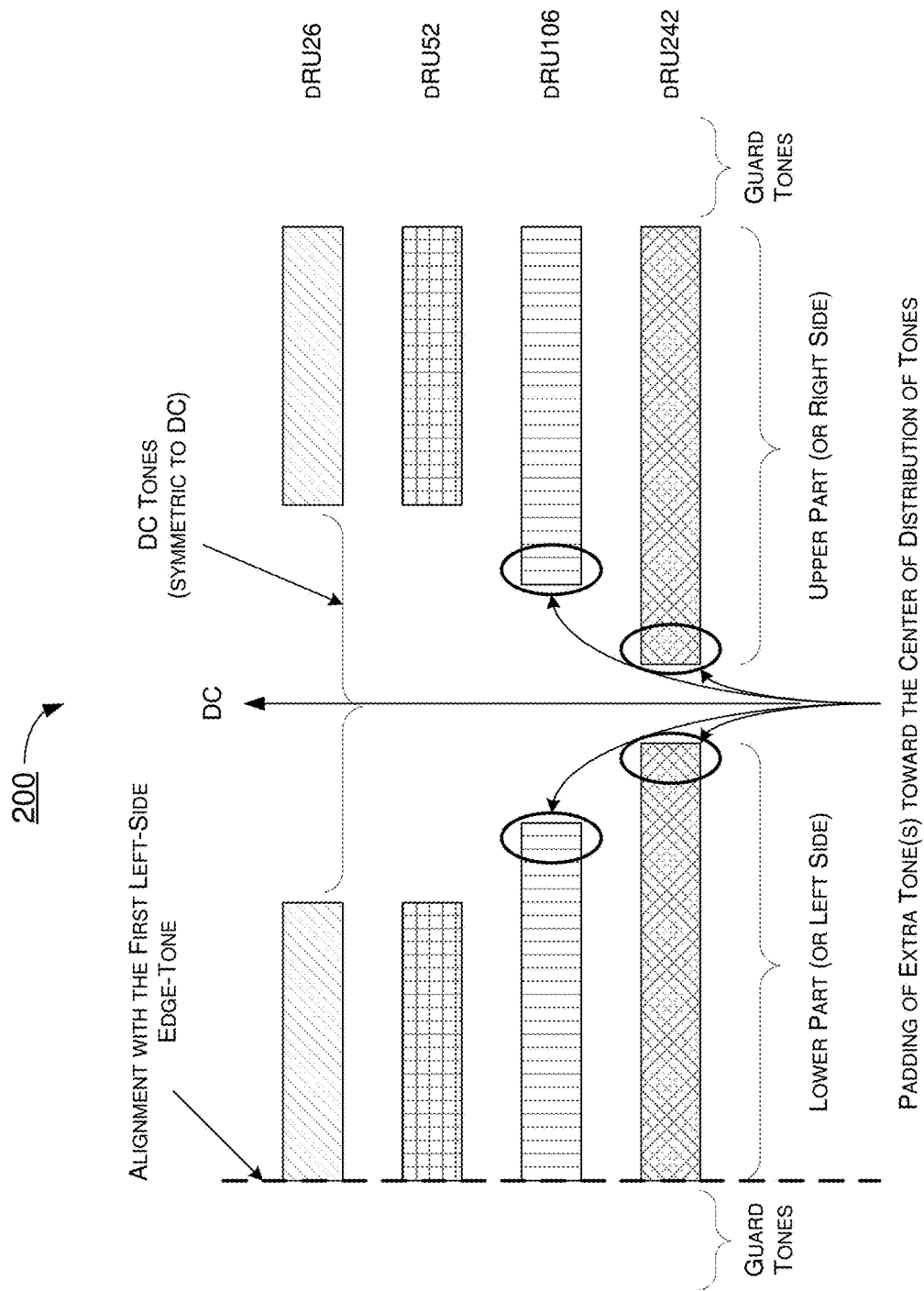
FIG. 2 is a diagram of an example design in accordance with an implementation of the present disclosure.

Under a first proposed schemes in accordance with the present disclosure, indices of a dRU may be edge-tone aligned and symmetric to a direct-current (DC) tone of one or more DC tones which is located at a center of a distribution of a plurality of tones of the dRU. FIG. 2 illustrates an example design 200 in accordance with the first proposed scheme. Referring to FIG. 2, each of a 26-tone dRU, a 52-tone dRU, a 106-tone dRU and a 242-tone dRU may include a lower part (or left side shown in FIG. 2) and an upper part (or right side shown in FIG. 2). Under the proposed scheme, the lower part and upper part may be DC-symmetric (or symmetric to the DC tone). That is, in an event that indices in the lower part are denoted by Lru and indices in the upper part are denoted by Uru, then mathematically Uru may be expressed as Uru=(−1)*Lru, since the lower part is a mirror image of the upper part.

Under the first proposed scheme, one 26-tone dRU index (e.g., the first 26-tone dRU or others) may be aligned to a given first left edge-tone (e.g., −122 or others for BW20, −244 or others for BW40, −500 or others for BW80, and so on). Other 26-tone dRU indices may be designed relative to the first 26-tone dRU based on $RU_{start}$. Once all the 26-tone dRUs are defined, dRUs of other sizes may be designed by using the 26-tone dRU as a basic building block.

For instance, each 52-tone dRU may be built by using two 26-tone dRUs. Moreover, each 106-tone dRU may be built by using four 26-tone dRUs (or two 52-tone dRUs) and further padding with one or more extra tones. The one or more extra tones may be padded toward the center of the distribution of the tones (or toward the DC tone). As shown in FIG. 2, one or more extra tones may be padded on the left side, and one or more extra tones may be padded on the right side. Furthermore, each 242-tone dRU may be built by using nine 26-tone dRUs (or two 106-tone dRUs plus one 26-tone dRU) and further padding with one or more extra tones (or padding four extra tones if built by two 106-tone dRUs plus one 26-tone dRU). The one or more extra tones may be padded toward the center of the distribution of the tones (or toward the DC tone). As shown in FIG. 2, four tones (or two tones) may be padded on the left side, and four tones (or two tones) may be padded on the right side. Similarly, each 484-tone dRU may be built by using two 242-tone dRUs. It is noteworthy that, under the proposed scheme, a dRU may maintain the same hierarchical structure as that of a regular RU.

Figure 3:
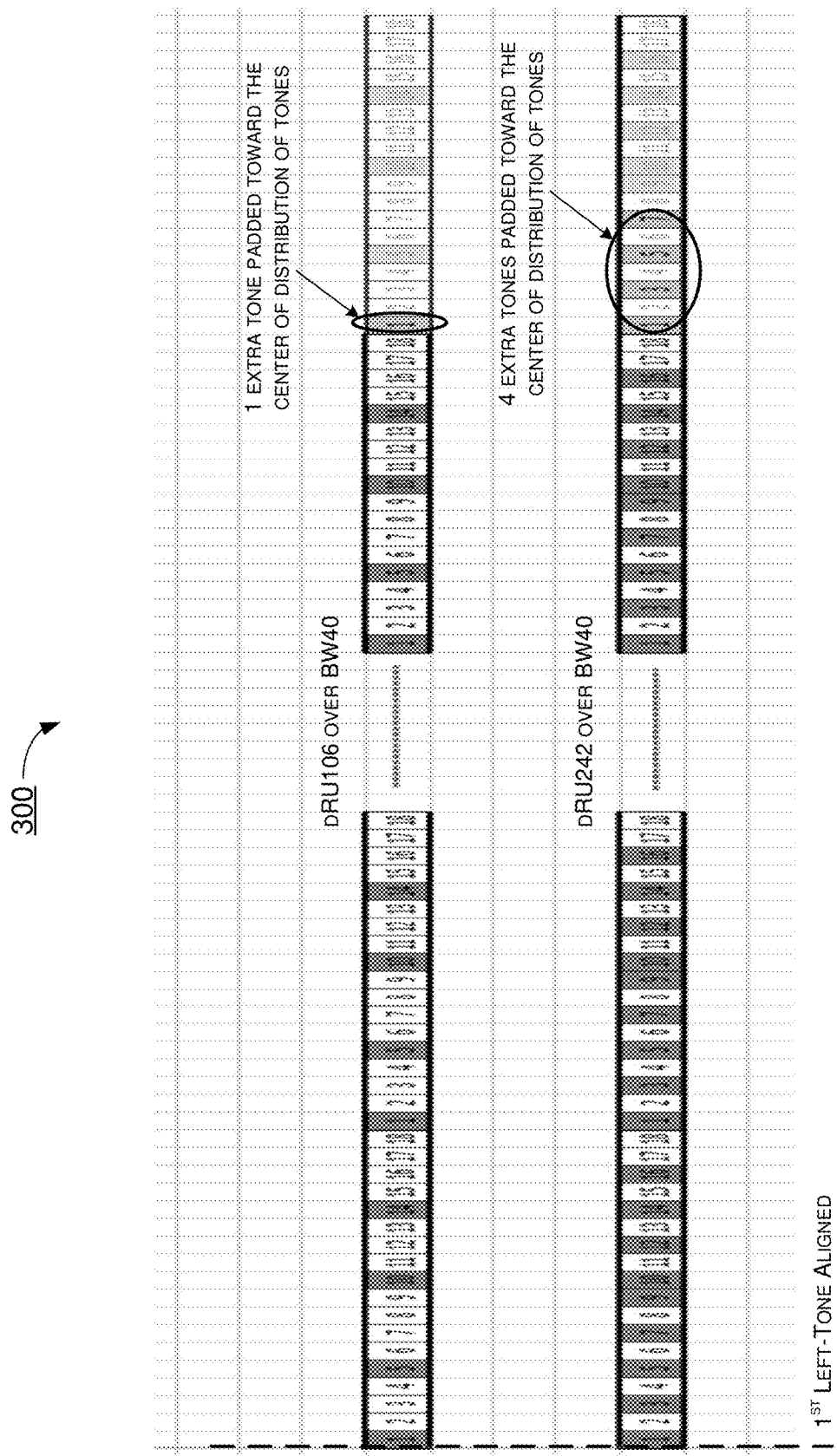
FIG. 3 is a diagram of an example scenario in accordance with an implementation of the present disclosure.

FIG. 3 illustrates an example scenario 300 in accordance with the first proposed scheme. In scenario 300, the distribution of tones of a dRU is edge-aligned and symmetric to a DC tone. Specifically, the top portion of FIG. 3 shows an example distribution of tones/indices of a 106-tone dRU over BW40, and the bottom portion of FIG. 3 shows an example distribution of tones/indices of a 242-tone dRU over BW40. In each case, the distribution of the tones/indices is first left tone-aligned, and the first left tone is bandwidth dependent (e.g., aligned to a given index such as −122 or −121 or −120 for BW20 and −244 or −243 etc for BW40, and so on). Also, each of the 106-tone dRU and 242-tone dRU may be padded with one or more extra tones. As shown in FIG. 3, the 106-tone dRU is padded with one extra tone toward the center of the distribution of the tones (and hence toward the DC tone) on each lower and upper part. Similarly, the 242-tone dRU is padded with four extra tones toward the center of the distribution of the tones (and hence toward the DC tone).

FIG. 4 illustrates an example design 400 in accordance with the first proposed scheme. Design 400 shows an example of generation of indices for a 26-tone dRU, a 52-tone dRU and a 106-tone dRU with edge-tone alignment while being symmetric to the DC tone. It is noteworthy that, in FIG. 4, the term "L1st" denotes the first left-edge tone, which may be bandwidth dependent. For instance, the first left-edge tone may be −122 or −121 or −120 etc for BW20 and −244 or −243 etc for BW40. It is also noteworthy that, in design 400, V(1:4)=[0, 2, 4, 6] for 106-tone dRU on BW20. Further, it is noteworthy that, in design 400, Lru=L1st+S(i)+[V, V+Np, V+2*Np, . . . , V+12*Np, V(1: 4)+13*Np] for a 242-tone dRU, where vector V denotes the tone distribution pattern within a repetition period Np and vector S denotes the RU$_{start}$ parameters.

FIG. 5 illustrates an example design 500 in accordance with the first proposed scheme. Design 500 shows an example of dRU indices for BW20. It is noteworthy that, in design 500, it is assumed that the first left-edge tone L1st=−122 for BW20, although L1st may be −121, −120 or another tone.

Figure 6:
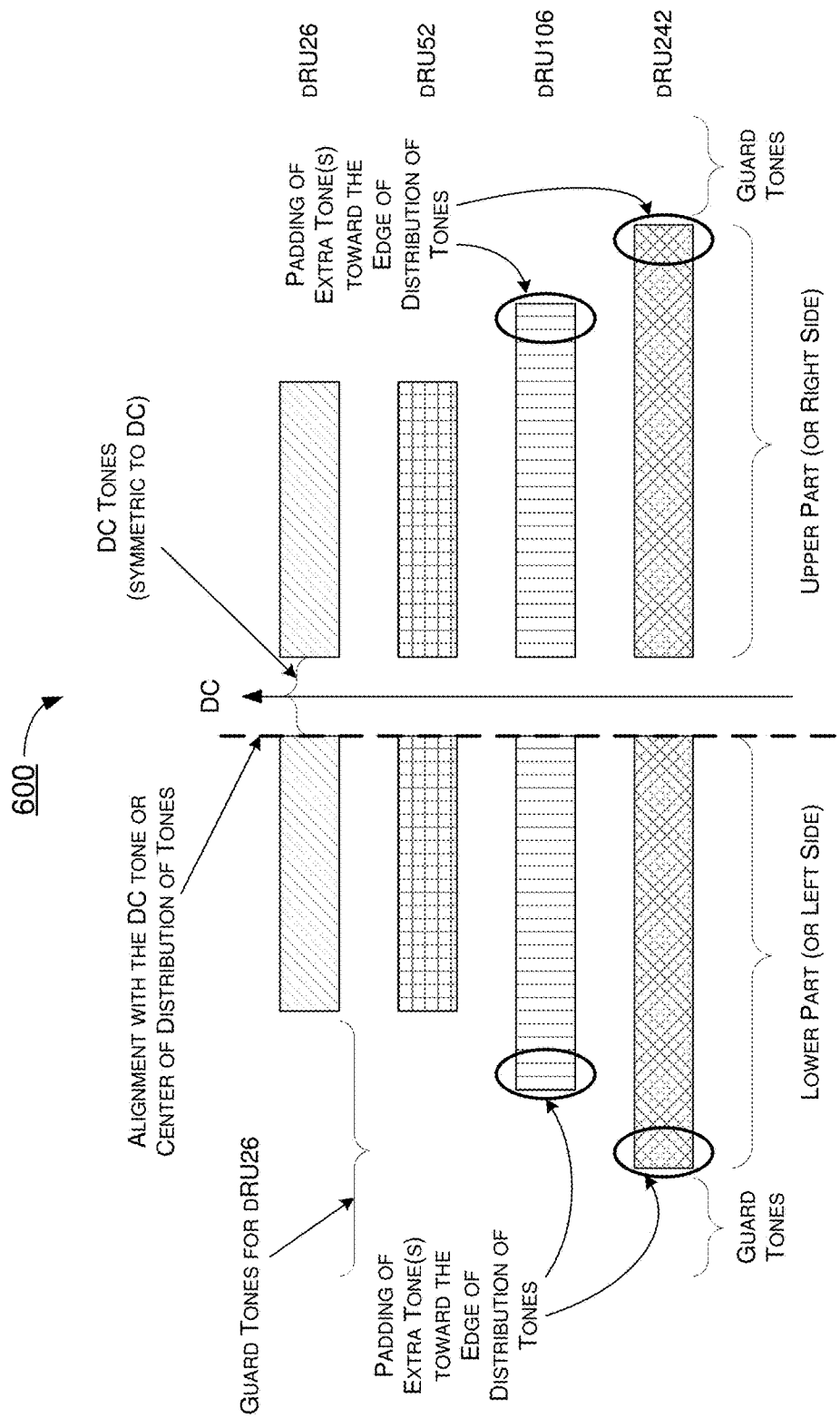
FIG. 6 is a diagram of an example design in accordance with an implementation of the present disclosure.

Under a second proposed schemes in accordance with the present disclosure, indices of a dRU may be center-aligned and symmetric to a DC tone of one or more DC tones which is located at a center of a distribution of a plurality of tones of the dRU. FIG. 6 illustrates an example design 600 in accordance with the second proposed scheme. Referring to FIG. 6, each of a 26-tone dRU, a 52-tone dRU, a 106-tone dRU and a 242-tone dRU may include a lower part (or left side shown in FIG. 6) and an upper part (or right side shown in FIG. 6). Under the proposed scheme, the lower part and upper part may be DC-symmetric (or symmetric to the DC tone). That is, in an event that indices in the lower part are denoted by Lru and indices in the upper part are denoted by Uru, then mathematically Uru may be expressed as Uru=(−1)*Lru, since the lower part is a mirror image of the upper part.

Under the second proposed scheme, one 26-tone dRU index (e.g., the first 26-tone dRU or others) may be aligned to the given DC tone (e.g., −2 or others for BW20, −3 or others for BW40, −3 or others for BW80, and so on). Other 26-tone dRU indices may be designed relative to the first 26-tone dRU or the last 26-tone dRU based on RU$_{start}$. Once all the 26-tone dRUs are defined, dRUs of other sizes may be designed by using the 26-tone dRU as a basic building block.

For instance, each 52-tone dRU may be built by using two 26-tone dRUs. Moreover, each 106-tone dRU may be built by using four 26-tone dRUs (or two 52-tone dRUs) and further padding with one or more extra tones. The one or more extra tones may be padded toward an edge (e.g., left edge or right edge) of the distribution of the tones. As shown in FIG. 6, one or more extra tones may be padded on the left side, and one or more extra tones may be padded on the right side. Furthermore, each 242-tone dRU may be built by using nine 26-tone dRUs (or two 106-tone dRUs plus one 26-tone dRU) and further padding with one or more extra tones (or padding four extra tones if built by two 106-tone dRUs plus one 26-tone dRU). The one or more extra tones may be padded toward an edge (e.g., left edge or right edge) of the distribution of the tones. As shown in FIG. 6, four tones (or two tones) may be padded on the left side, and four tones (or two tones) may be padded on the right side. Similarly, each 484-tone dRU may be built by using two 242-tone dRUs. It is noteworthy that, under the proposed scheme, a dRU may maintain the same hierarchical structure as that of a regular RU.

Figure 7:
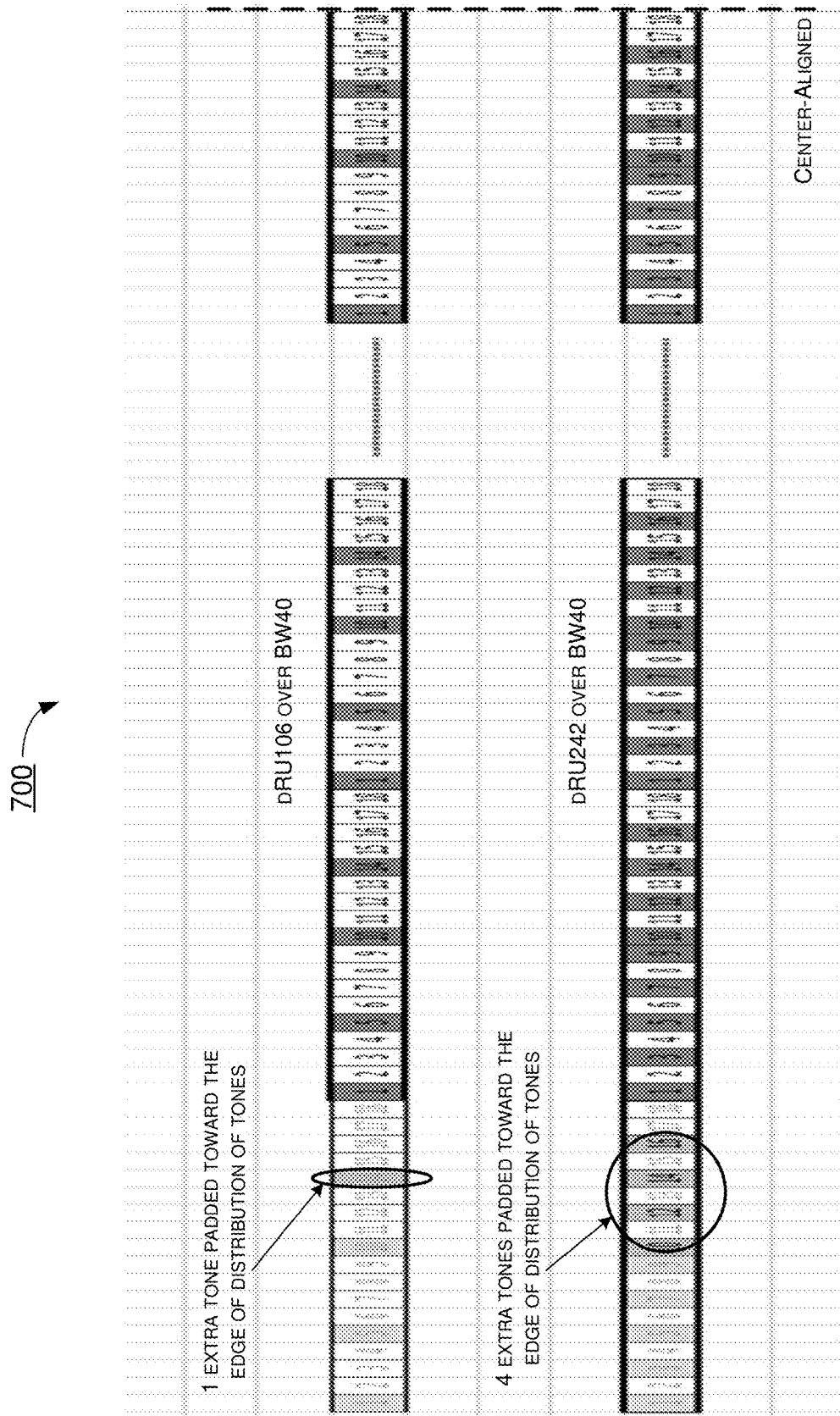
FIG. 7 is a diagram of an example scenario in accordance with an implementation of the present disclosure.

FIG. 7 illustrates an example scenario 700 in accordance with the second proposed scheme. In scenario 700, the distribution of tones of a dRU is center-aligned and symmetric to a DC tone. Specifically, the top portion of FIG. 7 shows an example distribution of tones/indices of a 106-tone dRU over BW40, and the bottom portion of FIG. 7 shows an example distribution of tones/indices of a 242-tone dRU over BW40. In each case, the distribution of the tones/indices is center-aligned (e.g., aligned to the DC tone). Also, each of the 106-tone dRU and 242-tone dRU may be padded with one or more extra tones. As shown in FIG. 7, the 106-tone dRU is padded with one extra tone toward an edge (e.g., left edge or right edge) of the distribution of the tones. Similarly, the 242-tone dRU is padded with four extra tones toward an edge (e.g., left edge or right edge) of the distribution of the tones.

FIG. 8 illustrates an example design 800 in accordance with the second proposed scheme. Design 800 shows an example of generation of indices for a 26-tone dRU, a 52-tone dRU and a 106-tone dRU with center (or DC tone) alignment while being symmetric to the DC tone. It is noteworthy that, in FIG. 8, the term "Ndc" denotes the number of DC tones and may be bandwidth dependent. For instance, Ndc may be 3 or 5 or else for BW20 and 5 or 7 or else for BW40, and so on. It is also noteworthy that, in design 800, V(1:4)=[0, 2, 4, 6] for 106-tone dRU on BW20. Further, it is noteworthy that, in design 800, Lru=(−1)* (13*Np+floor(Ndc/2))+S(i)+[V(6:9)−Np, V, V+Np, V+2*Np, . . . , V+12*NP] for a 242-tone dRU, where vector V denotes the tone distribution pattern within repetition period Np and vector S denotes the RU$_{start}$ parameters.

FIG. 9 illustrates an example design 900 in accordance with the second proposed scheme. Design 900 shows an example of dRU indices for BW20. It is noteworthy that, in design 900, it is assumed that the number of DC tones Ndc=3 for BW20, although Ndc may also be 5 or 7 or another value.

Figure 10:
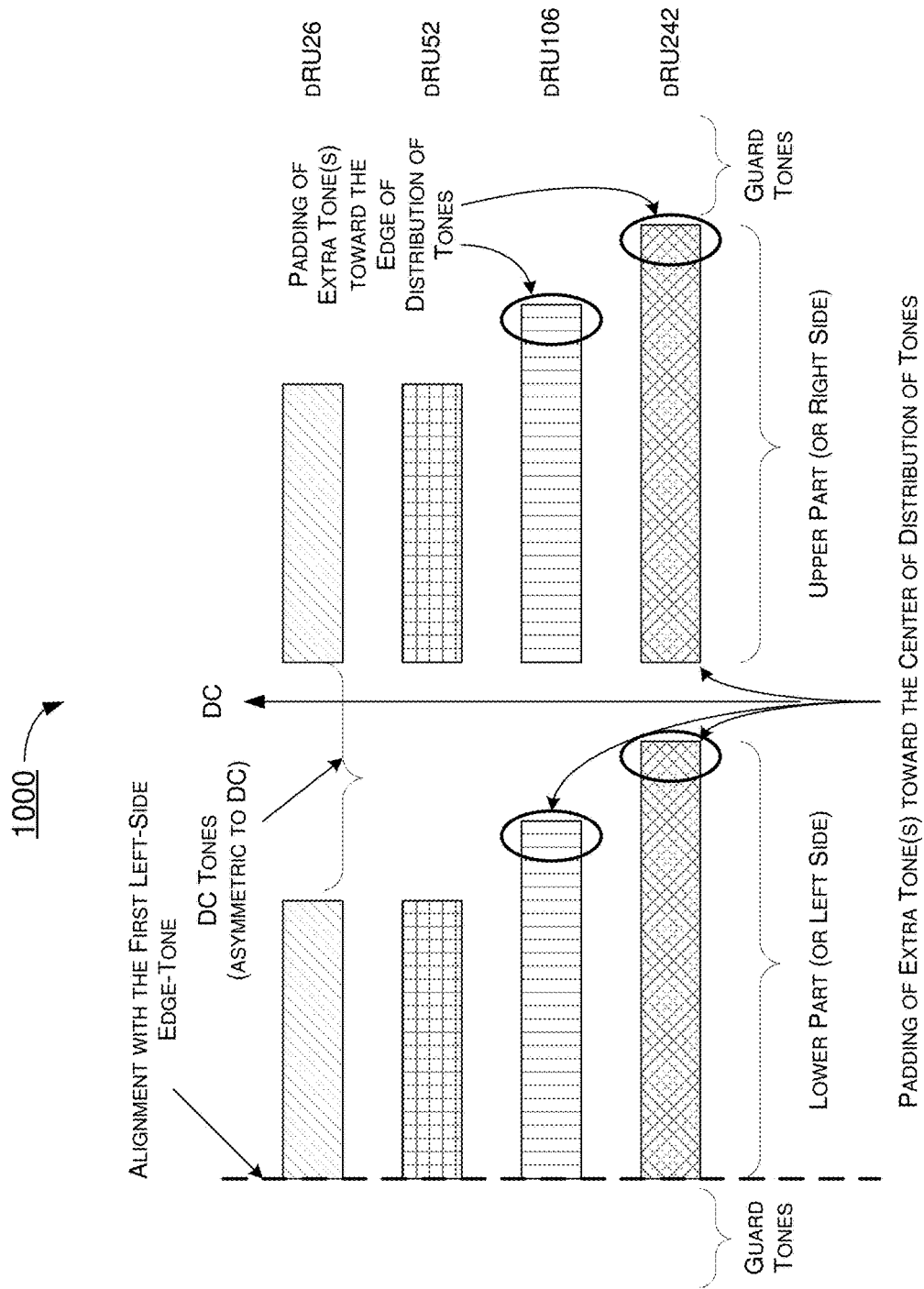
FIG. 10 is a diagram of an example design in accordance with an implementation of the present disclosure.

Under a third proposed schemes in accordance with the present disclosure, indices of a dRU may be edge-tone aligned and asymmetric to a DC tone of one or more DC tones which is located at a center of a distribution of a plurality of tones of the dRU. FIG. 10 illustrates an example design 1000 in accordance with the third proposed scheme. Referring to FIG. 10, each of a 26-tone dRU, a 52-tone dRU, a 106-tone dRU and a 242-tone dRU may include a lower part (or left side shown in FIG. 10) and an upper part (or right side shown in FIG. 10). Under the proposed scheme, the lower part and upper part may be not DC-symmetric (or asymmetric to the DC tone).

Under the third proposed scheme, one 26-tone dRU index (e.g., the first 26-tone dRU or others) may be aligned to a given first left edge-tone (e.g., −122 or others such as −121, or −120 etc for BW20, −244 or others for BW40, −500 or others for BW80, and so on). Other 26-tone dRU indices may be designed relative to the first 26-tone dRU based on $RU_{start}$. Once all the 26-tone dRUs are defined, dRUs of other sizes may be designed by using the 26-tone dRU as a basic building block.

For instance, each 52-tone dRU may be built by using two 26-tone dRUs. Moreover, each 106-tone dRU may be built by using four 26-tone dRUs (or two 52-tone dRUs) and further padding with one or more extra tones. The one or more extra tones may be padded toward the center and an edge (e.g., left edge or right edge) of the distribution of the tones. As shown in FIG. 10, one or more extra tones may be padded on the left side toward the center (or DC tone), and one or more extra tones may be padded on the right side toward the right edge of the distribution of the tones. Furthermore, each 242-tone dRU may be built by using nine 26-tone dRUs (or two 106-tone dRUs plus one 26-tone dRU) and further padding with one or more extra tones (or padding four extra tones if built by two 106-tone dRUs plus one 26-tone dRU). The one or more extra tones may be padded toward the center and an edge (e.g., left edge or right edge) of the distribution of the tones. As shown in FIG. 10, four tones (or two tones) may be padded on the left side toward the center (or DC tone), and four tones (or two tones) may be padded on the right side toward the right edge of the distribution of the tones. Similarly, each 484-tone dRU may be built by using two 242-tone dRUs. It is noteworthy that, under the proposed scheme, a dRU may maintain the same hierarchical structure as that of a regular RU.

FIG. 11 illustrates an example design 1100 in accordance with the third proposed scheme. Design 1100 shows an example of generation of indices for a 26-tone dRU, a 52-tone dRU and a 106-tone dRU with edge-tone alignment while being asymmetric to the DC tone. It is noteworthy that, in FIG. 11, the term "L1st" denotes the first left-edge tone, which may be bandwidth dependent. For instance, the first left-edge tone may be −122 or −121 or −120 etc for BW20 and −244 or −243 etc for BW40. It is also noteworthy that, in design 1100, V(1:4)=[0, 2, 4, 6] for 106-tone dRU on BW20. Further, it is noteworthy that, in design 1100, Lru=L1st+S(i)+[V, V+Np, V+2*Np, . . . , V+12*Np, V(1:4)+13*Np] for a 242-tone dRU, where vector V denotes the tone distribution pattern within repetition period Np and vector S denotes the $RU_{start}$ parameters. Moreover, DCshift denotes a shift relative to a DC tone at the center of tone distribution, where the DC tone at the center may be the DC tone with value 0.

FIG. 12 illustrates an example design 1200 in accordance with the third proposed scheme. Design 1200 shows an example of dRU indices for BW20. It is noteworthy that, in design 1200, it is assumed that the first left-edge tone L1st=−122 for BW20, although L1st may be −121, −120 or another tone.

Figure 13:
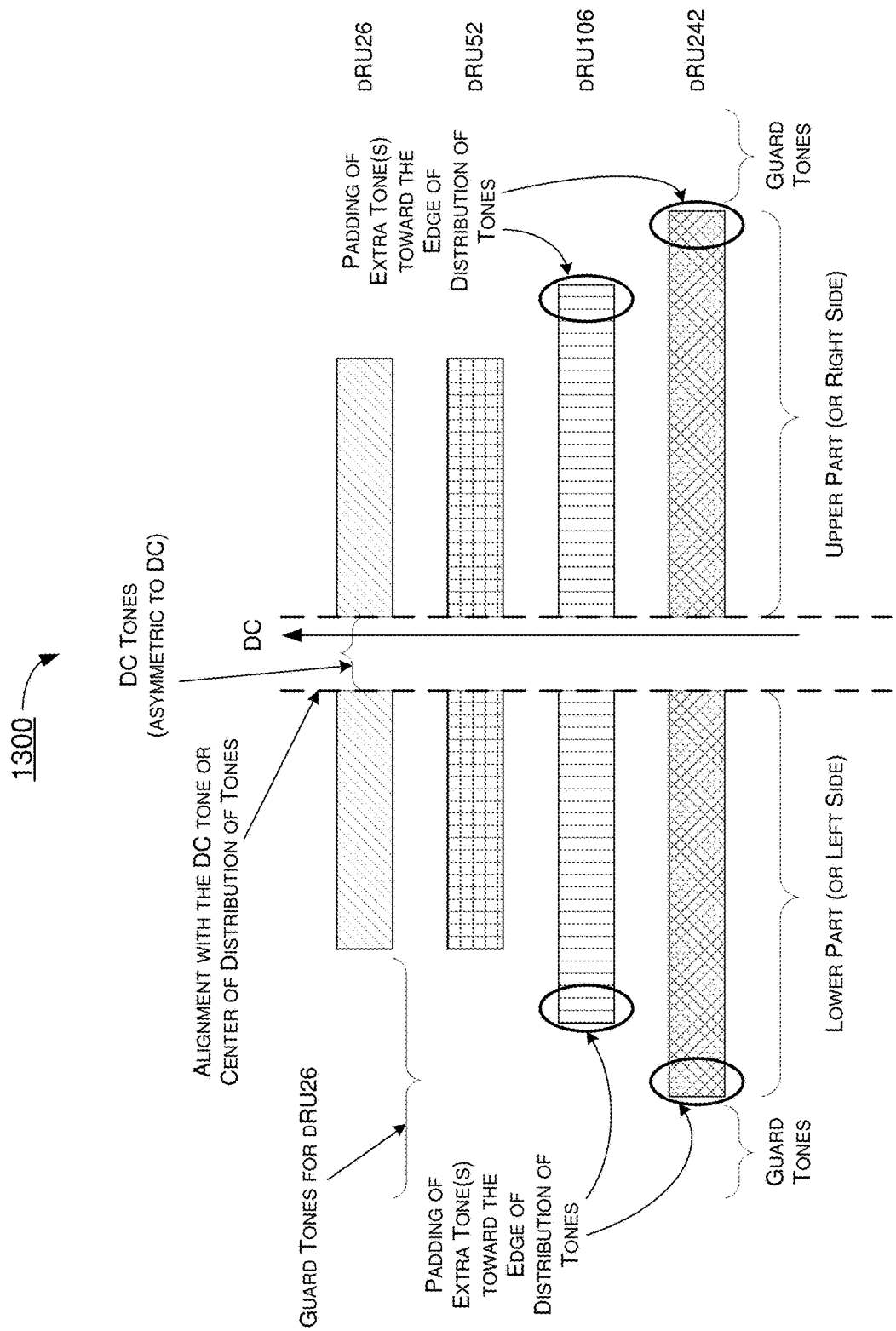
FIG. 13 is a diagram of an example design in accordance with an implementation of the present disclosure.

Under a fourth proposed schemes in accordance with the present disclosure, indices of a dRU may be center-aligned and asymmetric to a DC tone of one or more DC tones which is located at a center of a distribution of a plurality of tones of the dRU. FIG. 13 illustrates an example design 1300 in accordance with the fourth proposed scheme. Referring to FIG. 13, each of a 26-tone dRU, a 52-tone dRU, a 106-tone dRU and a 242-tone dRU may include a lower part (or left side shown in FIG. 13) and an upper part (or right side shown in FIG. 13). Under the proposed scheme, the lower part and upper part may be not DC-symmetric (or asymmetric to the DC tone).

Under the fourth proposed scheme, one 26-tone dRU index (e.g., the first 26-tone dRU or others) may be aligned to the given DC tone (e.g., −2 or others for BW20, −3 or others for BW40, −3 or others for BW80, and so on). Other 26-tone dRU indices may be designed relative to the first 26-tone dRU or the last 26-tone dRU based on $RU_{start}$. Once all the 26-tone dRUs are defined, dRUs of other sizes may be designed by using the 26-tone dRU as a basic building block.

For instance, each 52-tone dRU may be built by using two 26-tone dRUs. Moreover, each 106-tone dRU may be built by using four 26-tone dRUs (or two 52-tone dRUs) and further padding with one or more extra tones. The one or more extra tones may be padded toward an edge (e.g., left edge or right edge) of the distribution of the tones. As shown in FIG. 13, one or more extra tones may be padded on the left side toward the left edge of the distribution of the tones, and one or more extra tones may be padded on the right side toward the right edge of the distribution of the tones. Furthermore, each 242-tone dRU may be built by using nine 26-tone dRUs (or two 106-tone dRUs plus one 26-tone dRU) and further padding with one or more extra tones (or padding four extra tones if built by two 106-tone dRUs plus one 26-tone dRU). The one or more extra tones may be padded toward an edge (e.g., left edge or right edge) of the distribution of the tones. As shown in FIG. 13, four tones (or two tones) may be padded on the left side toward the left edge of the distribution of the tones, and four tones (or two tones) may be padded on the right side toward the right edge of the distribution of the tones. Similarly, each 484-tone dRU may be built by using two 242-tone dRUs. It is noteworthy that, under the proposed scheme, a dRU may maintain the same hierarchical structure as that of a regular RU.

FIG. 14 illustrates an example design 1400 in accordance with the fourth proposed scheme. Design 1400 shows an example of generation of indices for a 26-tone dRU, a 52-tone dRU and a 106-tone dRU with edge-tone alignment while being asymmetric to the DC tone. It is noteworthy that, in FIG. 14, the term "Ndc" denotes the number of DC tones and may be bandwidth dependent. For instance, Ndc may be 3 or 5 for BW20 and 5 or 7 for BW40. It is also noteworthy that, in design 1400, V(1:4)=[0, 2, 4, 6] for 106-tone dRU on BW20. Further, it is noteworthy that, in design 1400, Lru=(−1)*(13*NP+floor(Ndc/2))+S(i)+[V(6:9)−NP, V, V+Np, V+2*NP, . . . , V+12*Np], and Uru=ceil(Ndc/2)+S(i)+[V, V+Np, V+2*Np, . . . , V+12*Np, V(1:4)+13*Np] for a 242-tone dRU, where vector V denotes the tone distribution pattern within repetition period Np and vector S denotes the $RU_{start}$ parameters.

Figure 15:
FIG. 15 is a diagram of an example design in accordance with an implementation of the present disclosure.

FIG. 15 illustrates an example design 1500 in accordance with the fourth proposed scheme. Design 1500 shows an example of dRU indices for BW20. It is noteworthy that, in design 1500, it is assumed that the first left-edge tone L1st=−118 for BW20, although L1st may be −121, −120 or another tone.

Illustrative Implementations

Figure 16:
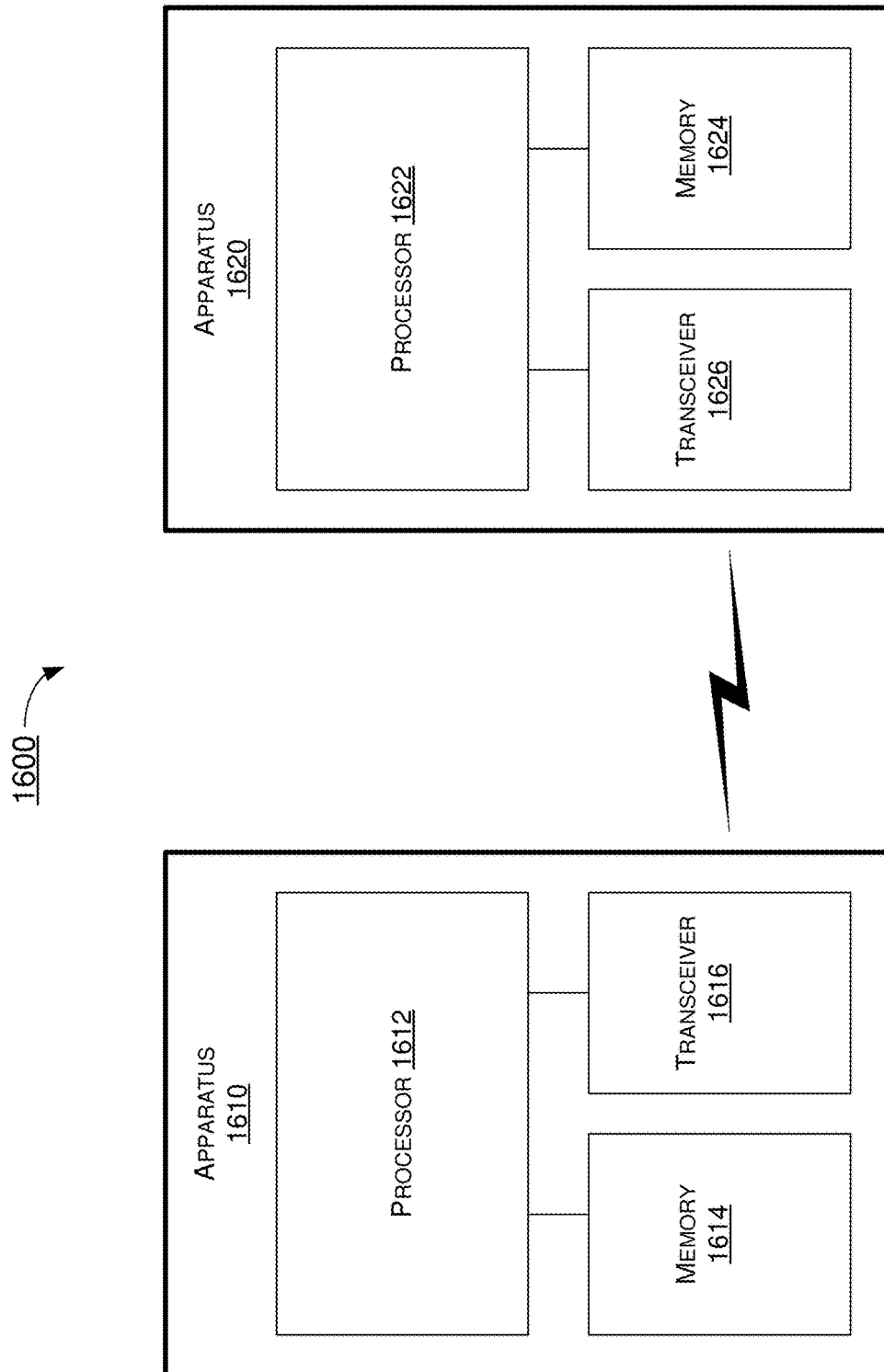
FIG. 16 is a block diagram of an example communication system in accordance with an implementation of the present disclosure.

FIG. 16 illustrates an example system 1600 having at least an example apparatus 1610 and an example apparatus 1620 in accordance with an implementation of the present disclosure. Each of apparatus 1610 and apparatus 1620 may perform various functions to implement schemes, techniques, processes and methods described herein pertaining to tone alignment for dRUs in 6 GHz LPI systems, including the various schemes described above with respect to various proposed designs, concepts, schemes, systems and methods described above as well as processes described below. For instance, apparatus 1610 may be an example implementation of communication entity 110, and apparatus 1620 may be an example implementation of communication entity 120.

Each of apparatus 1610 and apparatus 1620 may be a part of an electronic apparatus, which may be a STA or an AP, such as a portable or mobile apparatus, a wearable apparatus, a wireless communication apparatus or a computing apparatus. For instance, each of apparatus 1610 and apparatus 1620 may be implemented in a smartphone, a smart watch, a personal digital assistant, a digital camera, or a computing equipment such as a tablet computer, a laptop computer or a notebook computer. Each of apparatus 1610 and apparatus 1620 may also be a part of a machine type apparatus, which may be an IoT apparatus such as an immobile or a stationary apparatus, a home apparatus, a wire communication apparatus or a computing apparatus. For instance, each of apparatus 1610 and apparatus 1620 may be implemented in a smart thermostat, a smart fridge, a smart door lock, a wireless speaker or a home control center. When implemented in or as a network apparatus, apparatus 1610 and/or apparatus 1620 may be implemented in a network node, such as an AP in a WLAN.

In some implementations, each of apparatus 1610 and apparatus 1620 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1610 and apparatus 1620 may be implemented in or as a STA or an AP. Each of apparatus 1610 and apparatus 1620 may include at least some of those components shown in FIG. 16 such as a processor 1612 and a processor 1622, respectively, for example. Each of apparatus 1610 and apparatus 1620 may further include one or more other components not pertinent to the proposed scheme of the present disclosure (e.g., internal power supply, display device and/or user interface device), and, thus, such component(s) of apparatus 1610 and apparatus 1620 are neither shown in FIG. 16 nor described below in the interest of simplicity and brevity.

In one aspect, each of processor 1612 and processor 1622 may be implemented in the form of one or more single-core processors, one or more multi-core processors, one or more RISC processors or one or more CISC processors. That is, even though a singular term "a processor" is used herein to refer to processor 1612 and processor 1622, each of processor 1612 and processor 1622 may include multiple processors in some implementations and a single processor in other implementations in accordance with the present disclosure. In another aspect, each of processor 1612 and processor 1622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1612 and processor 1622 is a special-purpose machine specifically designed, arranged and configured to perform specific tasks including those pertaining to tone alignment for dRUs in 6 GHz LPI systems in accordance with various implementations of the present disclosure. For instance, each of processor 1612 and processor 1622 may be configured with hardware components, or circuitry, implementing one, some or all of the examples described and illustrated herein.

In some implementations, apparatus 1610 may also include a transceiver 1616 coupled to processor 1612. Transceiver 1616 may be capable of wirelessly transmitting and receiving data. In some implementations, apparatus 1620 may also include a transceiver 1626 coupled to processor 1622. Transceiver 1626 may include a transceiver capable of wirelessly transmitting and receiving data.

In some implementations, apparatus 1610 may further include a memory 1614 coupled to processor 1612 and capable of being accessed by processor 1612 and storing data therein. In some implementations, apparatus 1620 may further include a memory 1624 coupled to processor 1622 and capable of being accessed by processor 1622 and storing data therein. Each of memory 1614 and memory 1624 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1614 and memory 1624 may include a type of read-only memory (ROM) such as mask ROM, programmable ROM (PROM), erasable programmable ROM (EPROM) and/or electrically erasable programmable ROM (EEPROM). Alternatively, or additionally, each of memory 1614 and memory 1624 may include a type of non-volatile random-access memory (NVRAM) such as flash memory, solid-state memory, ferroelectric RAM (FeRAM), magnetoresistive RAM (MRAM) and/or phase-change memory.

Each of apparatus 1610 and apparatus 1620 may be a communication entity capable of communicating with each other using various proposed schemes in accordance with the present disclosure. For illustrative purposes and without limitation, a description of capabilities of apparatus 1610, as communication entity 110, and apparatus 1620, as communication entity 120, is provided below. It is noteworthy that, although the example implementations described below are provided in the context of WLAN, the same may be implemented in other types of networks. Thus, although the following description of example implementations pertains to a scenario in which apparatus 1610 functions as a transmitting device and apparatus 1620 functions as a receiving device, the same is also applicable to another scenario in which apparatus 1610 functions as a receiving device and apparatus 1620 functions as a transmitting device.

Under a proposed scheme in accordance with the present disclosure with respect to tone alignment for dRUs in 6 GHz LPI systems, processor 1612 of apparatus 1610 may distribute subcarriers of a RU over a bandwidth to generate a dRU with tone alignment. Moreover, processor 1612 may communicate wirelessly, via transceiver 1616, using the dRU.

In some implementations, the dRU with tone alignment may be generated with a plurality of indices of the dRU that are edge-tone aligned and asymmetric to a DC tone located at a center of a distribution of a plurality of tones of the dRU. In some implementations, the plurality of tones of the dRU may include at least 106 tones with one or more extra tones padded toward the DC tone and an edge of the distribution of the plurality of tones.

In some implementations, the dRU with tone alignment may be generated with a plurality of indices of the dRU that are center-aligned and asymmetric to a DC tone located at a center of a distribution of a plurality of tones of the dRU. In some implementations, the plurality of tones of the dRU may include at least 106 tones with one or more extra tones padded toward an edge of the distribution of the plurality of tones.

In some implementations, the dRU with tone alignment may be generated with a plurality of indices of the dRU that are edge-tone aligned and symmetric to a DC tone located at a center of a distribution of a plurality of tones of the dRU. In some implementations, the plurality of tones of the dRU may include at least 106 tones with one or more extra tones padded toward the DC tone.

In some implementations, the dRU with tone alignment may be generated with a plurality of indices of the dRU that are center-aligned and symmetric to a DC tone located at a center of a distribution of a plurality of tones of the dRU. In some implementations, the plurality of tones of the dRU may include at least 106 tones with one or more extra tones padded toward an edge of the distribution of the plurality of tones.

In some implementations, in communicating wirelessly with the dRU, processor 1612 may communicate wirelessly using the dRU in a 6 GHz LPI system.

Illustrative Processes

Figure 17:
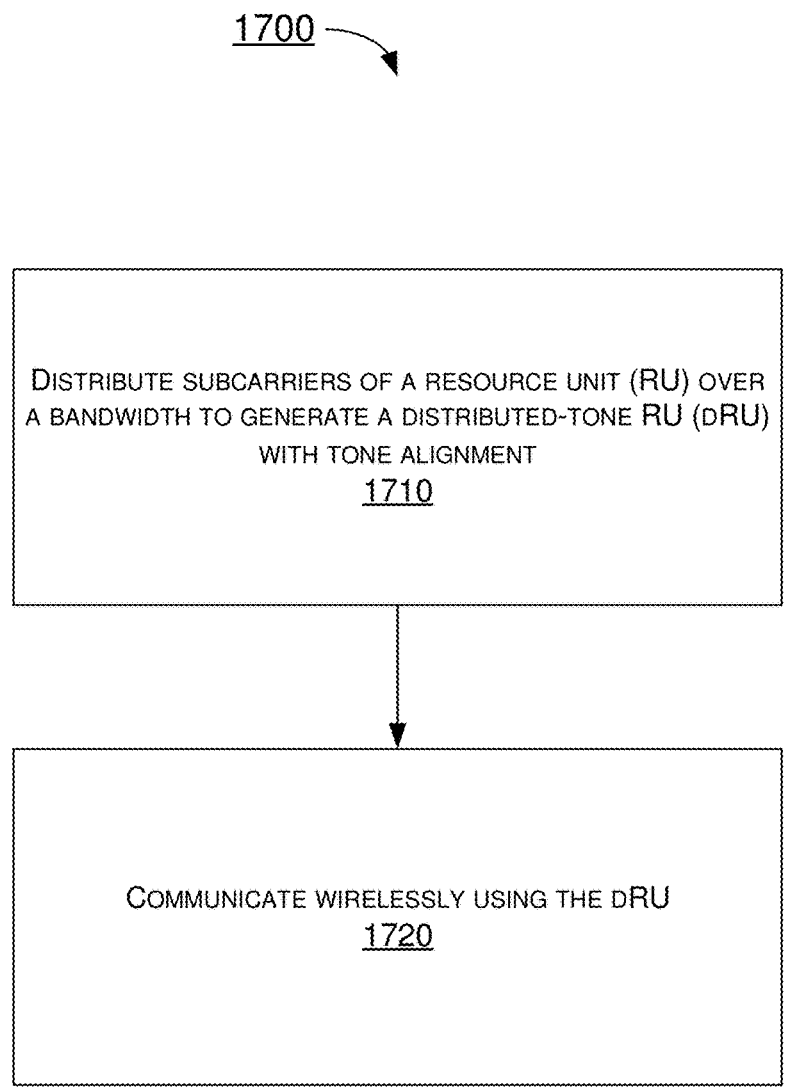
FIG. 17 is a flowchart of an example process in accordance with an implementation of the present disclosure.

FIG. 17 illustrates an example process 1700 in accordance with an implementation of the present disclosure. Process 1700 may represent an aspect of implementing various proposed designs, concepts, schemes, systems and methods described above. More specifically, process 1700 may represent an aspect of the proposed concepts and schemes pertaining to tone alignment for dRUs in 6 GHz LPI systems in accordance with the present disclosure. Process 1700 may include one or more operations, actions, or functions as illustrated by one or more of blocks 1710 and 1720. Although illustrated as discrete blocks, various blocks of process 1700 may be divided into additional blocks, combined into fewer blocks, or eliminated, depending on the desired implementation. Moreover, the blocks/sub-blocks of process 1700 may be executed in the order shown in FIG. 17 or, alternatively in a different order. Furthermore, one or more of the blocks/sub-blocks of process 1700 may be executed repeatedly or iteratively. Process 1700 may be implemented by or in apparatus 1610 and apparatus 1620 as well as any variations thereof. Solely for illustrative purposes and without limiting the scope, process 1700 is described below in the context of apparatus 1610 as communication entity 110 (e.g., a transmitting device whether a STA or an AP) and apparatus 1620 as communication entity 120 (e.g., a receiving device whether a STA or an AP) of a wireless network such as a WLAN in accordance with one or more of IEEE 802.11 standards. Process 1700 may begin at block 1710.

At 1710, process 1700 may involve processor 1612 of apparatus 1610 distributing subcarriers of a RU over a bandwidth to generate a dRU with tone alignment. Process 1700 may proceed from 1710 to 1720.

At 1720, process 1700 may involve processor 1612 communicating wirelessly, via transceiver 1616, using the dRU.

In some implementations, the dRU with tone alignment may be generated with a plurality of indices of the dRU that are edge-tone aligned and asymmetric to a DC tone located at a center of a distribution of a plurality of tones of the dRU. In some implementations, the plurality of tones of the dRU may include at least 106 tones with one or more extra tones padded toward the DC tone and an edge of the distribution of the plurality of tones.

In some implementations, the dRU with tone alignment may be generated with a plurality of indices of the dRU that are center-aligned and asymmetric to a DC tone located at a center of a distribution of a plurality of tones of the dRU. In some implementations, the plurality of tones of the dRU may include at least 106 tones with one or more extra tones padded toward an edge of the distribution of the plurality of tones.

In some implementations, the dRU with tone alignment may be generated with a plurality of indices of the dRU that are edge-tone aligned and symmetric to a DC tone located at a center of a distribution of a plurality of tones of the dRU. In some implementations, the plurality of tones of the dRU may include at least 106 tones with one or more extra tones padded toward the DC tone.

In some implementations, the dRU with tone alignment may be generated with a plurality of indices of the dRU that are center-aligned and symmetric to a DC tone located at a center of a distribution of a plurality of tones of the dRU. In some implementations, the plurality of tones of the dRU may include at least 106 tones with one or more extra tones padded toward an edge of the distribution of the plurality of tones.

In some implementations, in communicating wirelessly with the dRU, process 1700 may involve processor 1612 communicating wirelessly using the dRU in a 6 GHz LPI system.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    distributing subcarriers of a resource unit (RU) over a bandwidth to generate a distributed-tone RU (dRU) with tone alignment; and
    communicating wirelessly using the dRU,
    wherein the dRU with tone alignment is generated with a plurality of indices of the dRU that are center-aligned and asymmetric to a direct-current (DC) tone located at a center of a distribution of a plurality of tones of the dRU.

2. The method of claim 1, wherein the plurality of tones of the dRU comprises at least 106 tones with one or more extra tones padded toward an edge of the distribution of the plurality of tones.

3. The method of claim 1, wherein the communicating wirelessly with the dRU comprises communicating wirelessly using the dRU in a 6 GHz low-power indoor (LPI) system.

4. An apparatus, comprising:
    a transceiver configured to transmit and receive wirelessly; and
    a processor coupled to the transceiver and configured to perform, via the transceiver, operations comprising:
        distributing subcarriers of a resource unit (RU) over a bandwidth to generate a distributed-tone RU (dRU) with tone alignment; and
        communicating wirelessly using the dRU,
    wherein the dRU with tone alignment is generated with a plurality of indices of the dRU that are center-aligned and asymmetric to a direct-current (DC) tone located at a center of a distribution of a plurality of tones of the dRU.

5. The apparatus of claim 4, wherein the plurality of tones of the dRU comprises at least 106 tones with one or more extra tones padded toward an edge of the distribution of the plurality of tones.

6. The apparatus of claim 4, wherein, in communicating wirelessly with the dRU, the processor is configured to communicate wirelessly using the dRU in a 6 GHz low-power indoor (LPI) system.

* * * * *